(12) United States Patent
Barone

(10) Patent No.: US 7,854,794 B2
(45) Date of Patent: Dec. 21, 2010

(54) ROTARY VALVE ELEMENT FOR TWIN BED ALTERNATIVE TREATMENT SYSTEMS

(76) Inventor: Michael R. Barone, 25 Smith Farm Rd., Amston, CT (US) 06231

( * ) Notice: Subject to any disclaimer, the term of this patent is extended or adjusted under 35 U.S.C. 154(b) by 302 days.

(21) Appl. No.: 12/180,579

(22) Filed: Jul. 28, 2008

(65) Prior Publication Data

US 2010/0018399 A1    Jan. 28, 2010

(51) Int. Cl.
*B01D 53/04* (2006.01)

(52) U.S. Cl. .......................... 96/124; 251/174

(58) Field of Classification Search .............. 96/121, 96/124, 130, 144; 95/139; 251/174, 180, 251/192, 315.01; 137/625.46; 128/201.25
See application file for complete search history.

(56) References Cited

U.S. PATENT DOCUMENTS

| | | | | |
|---|---|---|---|---|
| 3,577,988 | A | * | 5/1971 | Jones ................. 128/201.25 |
| 4,162,146 | A | * | 7/1979 | Seibert ................. 96/113 |
| 4,877,429 | A | * | 10/1989 | Hunter ................. 95/95 |
| 5,114,441 | A | * | 5/1992 | Kanner et al. ........... 95/98 |
| 5,256,174 | A | * | 10/1993 | Kai et al. ............. 96/116 |
| 5,584,322 | A | * | 12/1996 | Poschl et al. .......... 137/625.46 |
| 5,593,480 | A | * | 1/1997 | Poschl ................ 96/124 |
| 5,814,131 | A | * | 9/1998 | Lemcoff et al. ......... 95/96 |
| 6,364,938 | B1 | * | 4/2002 | Birbara et al. ......... 95/139 |
| 6,709,483 | B1 | | 3/2004 | Hodgson, Jr. |
| 6,755,892 | B2 | | 6/2004 | Nalette et al. |
| 6,797,043 | B2 | | 9/2004 | Nalette et al. |
| 6,802,970 | B2 | * | 10/2004 | Rochette ............... 210/264 |
| 6,863,711 | B2 | | 3/2005 | Tongue et al. |
| 7,089,933 | B2 | | 8/2006 | Goldblatt et al. |
| 7,250,150 | B1 | | 7/2007 | Keefer et al. |
| 7,384,454 | B2 | | 6/2008 | Tongue |
| 2002/0148221 | A1 | | 10/2002 | Jagtoyen |
| 2007/0028769 | A1 | | 2/2007 | Eplee |

* cited by examiner

*Primary Examiner*—Frank M Lawrence
(74) *Attorney, Agent, or Firm*—Carlson, Gaskey & Olds

(57) ABSTRACT

In a disclosed embodiment, a chemical process has a pair of beds, with each of said beds having at least one connection to receive a source of gas, and for delivering gas downstream. Each of the beds includes chemical treatment elements. The system includes a connection to a source of a gas to be treated, and a connection for receiving treated gas to be delivered to a downstream use, a connection to a source of a cleaning gas, and a connection to deliver the cleaning gas downstream. A rotary valve includes a rotary actuator for rotating a valve to selectively switch each of the beds between the several connections.

11 Claims, 8 Drawing Sheets

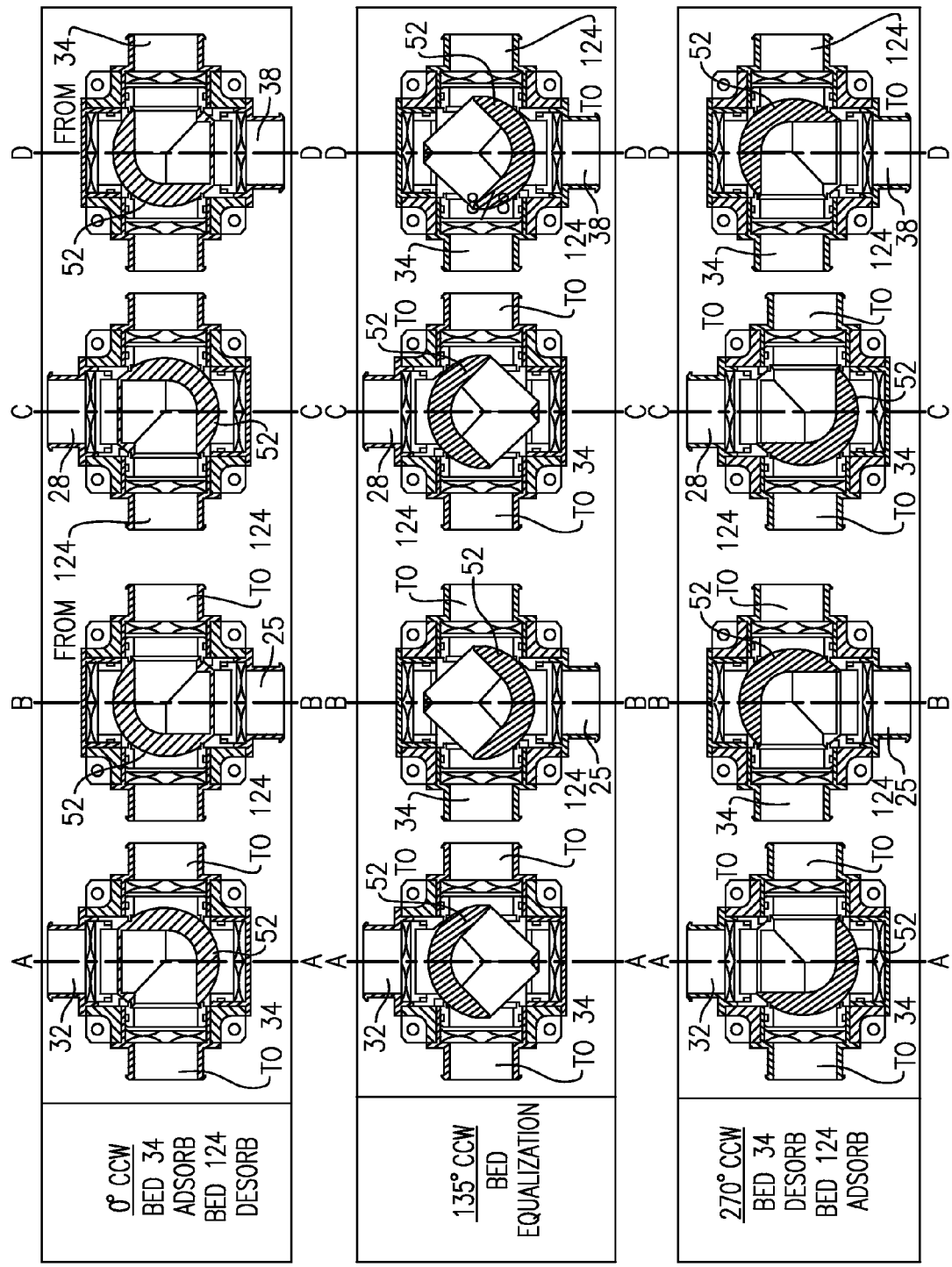

_US 7,854,794 B2_

ROTARY VALVE ELEMENT FOR TWIN BED ALTERNATIVE TREATMENT SYSTEMS

BACKGROUND OF THE INVENTION

This invention relates to a rotary valving system for routing all of the gas flow in a twin bed treatment system.

Systems are known which provide breathable air through an adsorption process. Typically, at least two beds which include a sorbent material, such as sorbent beads, are operated in combination. A gas stream containing impurities, such as carbon dioxide in air, is passed through a first sorbent bed. The impurities, such as carbon dioxide are removed by the sorbent beads, and a cleaned air stream is passed downstream to a use. The use might be a space suit, a space station, a submarine, or any other habituated environment which does not have ready access to breathable air. The gas stream containing the impurities typically returns from this use.

At the same time as the first sorbent bed is removing impurities and providing clean air, a second sorbent bed is being desorbed. In a desorbed process a cleaning or sweep gas is past through the second bed, and removes impurities. The sweep gas and the entrained impurities are past to a treatment process, or vented into an atmosphere about the environment. While the term "sweep gas" may be utilized in this application, it should be understood that the sweep gas may also be the application of a vacuum to remove the impurities.

A valving system is required for these systems to alternately connect the beds in a continuous cycle. Often, separate valve members and valve actuators have been provided for each of the beds. Linear actuators have also utilized. Overall, the valving systems have been large and complex.

SUMMARY OF THE INVENTION

In a disclosed embodiment, a chemical process has a pair of beds, with each of said beds having at least one connection to receive a source of gas, and for delivering gas downstream. Each of the beds includes chemical treatment elements. The system includes a connection to a source of a gas to be treated, and a connection for receiving treated gas to be delivered to a downstream use, a connection to a source of a cleaning gas, and a connection to deliver the cleaning gas downstream. A rotary valve includes a rotary actuator for rotating a valve to selectively switch each of the beds between the several connections.

These and other features of the present invention can be best understood from the following specification and drawings, the following of which is a brief description.

BRIEF DESCRIPTION OF THE DRAWINGS

FIG. 7B shows the valve of FIG. 7A in a first rotated position.

FIG. 7C shows the valve of FIG. 7A in a second rotated position.

FIG. 7D shows the valve of FIG. 7A in a third rotated position.

DETAILED DESCRIPTION OF THE PREFERRED EMBODIMENT

Figure 1:
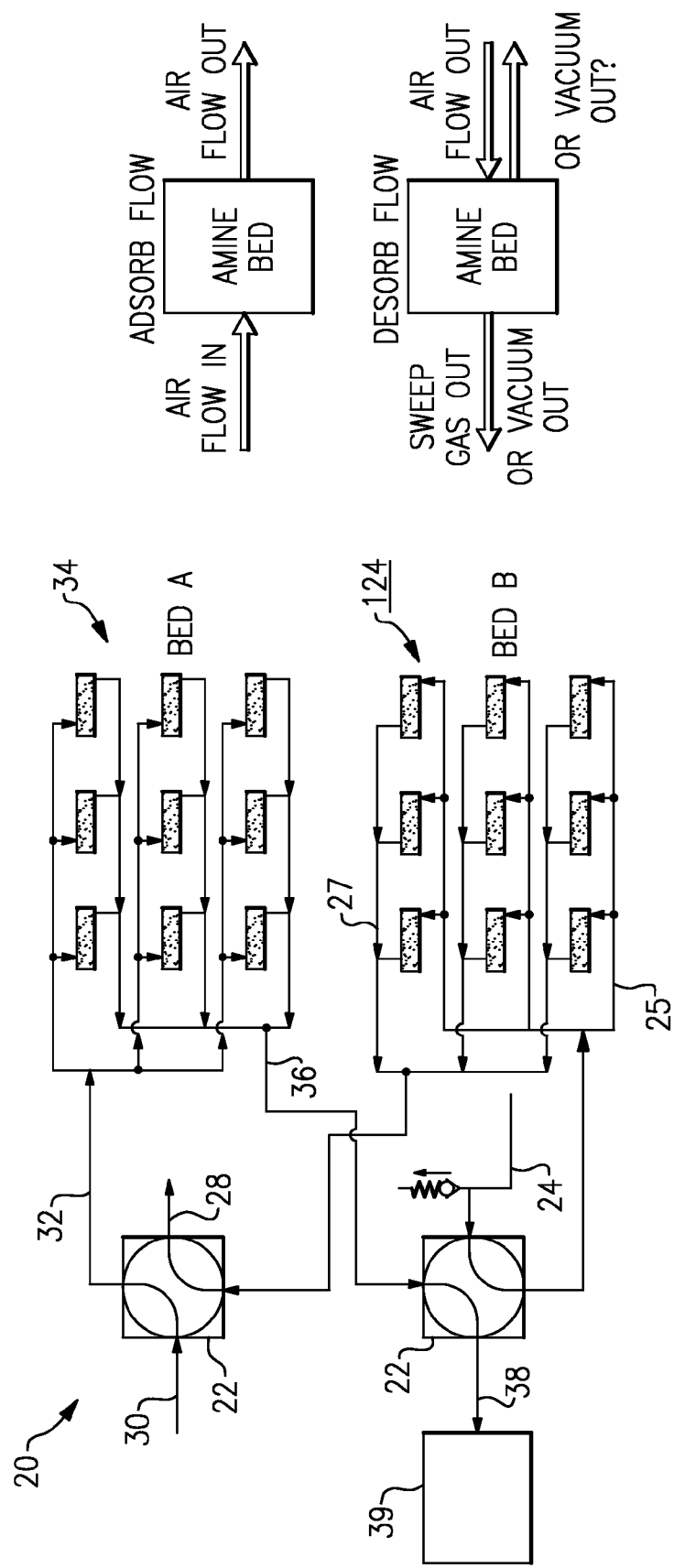
FIG. 1 schematically shows a twin bed system with a rotary valve.

A system 20 for providing a clean air flow is illustrated in FIG. 1. A rotary valve 22 is shown schematically in FIG. 1, and controls the flow of gases to a sorbent bed B (124) and a sorbent bed A (34). As mentioned, the beds may contain sorbent beads.

A source 30 of air to be cleaned passes through the rotary valve 22 and to a connection 32 leading to the beds 34 in the FIG. 1 position. The beds remove impurities from this air, and pass a clean air stream to a connection 36 leading back through the rotary valve 22 and to an air flow return 38, which would lead to an environment to utilize the air 39. As mentioned above, environment 39 may be a spaceship, a space suit, etc. While the applications mentioned above are typical, the twin bed process has been utilized for various chemical treatments, and the valve of this invention would have application in such systems. Generally, the valve of this application would be beneficial in any twin bed chemical process wherein the beds are alternatively put in a "cleaning" and "being cleaned" modes as will be explained below.

At the same time the air to be cleaned is passing through the bed 34, a sweep gas is provided from source 24 through the rotary valve 22, to a connection 25 leading to the bed 124. This sweep gas will remove impurities which have been previously deposited in bed 124, and drive the impurities along with the sweep gas to a connection 27 leading back through the rotary valve 22 to a sweep gas vent or a vacuum. This gas is typically either treated by chemical processes, or merely vented from the environment.

As is well known, the beds 34 and 124 continue to switch between the "cleaning" and "being cleaned" modes.

Figure 2A:
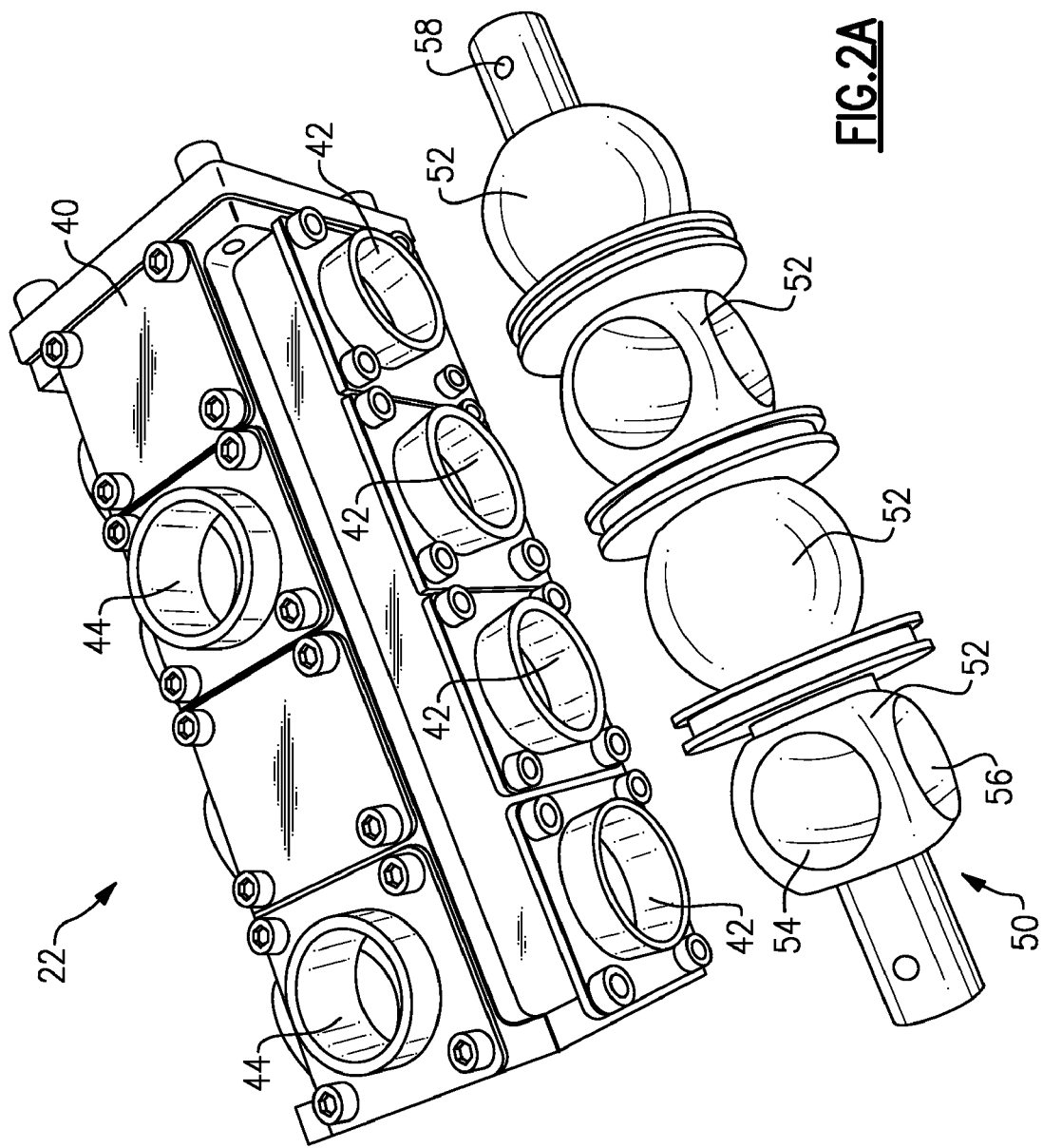
FIG. 2A shows components of the rotary valve.

FIG. 2A shows details of the rotary valve 22. As shown, a valve housing 40 includes four side connections or ports 42, and two top connections or ports 44. Two other connections 44 are placed on a bottom side of FIG. 2A, and four other side connections 42 face into the plane of this Figure and cannot be seen.

As shown, a rotary valve element 50 includes four ball valves 52 having a fluid L-shaped connection between ports 54 and 56. A driveshaft 58 drives the valve element 50, as will be explained below.

Figure 2B:
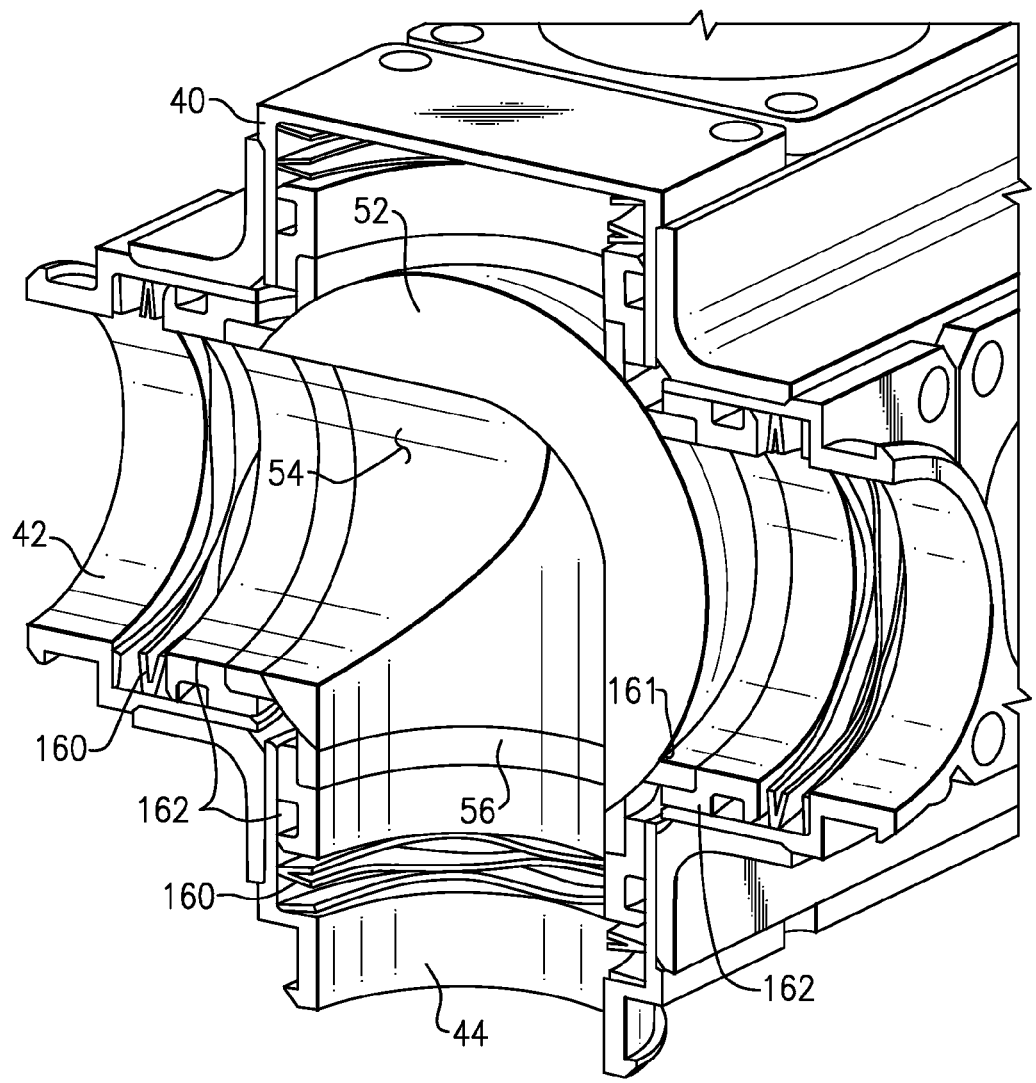
FIG. 2B shows a detail of one ball on the rotary valve.

As shown in FIG. 2B, the ball valve 52 is rotatable within the housing 40. A spring element 160 biases a valve seat 162 upwardly against the ports 54 and 56 to provide a fluid tight seal. As can also be appreciated from FIG. 2B, other valve seats 162 are being biased against the outer periphery 161 of the ball valve 52 to provide a fluid tight seal.

Figure 2C:
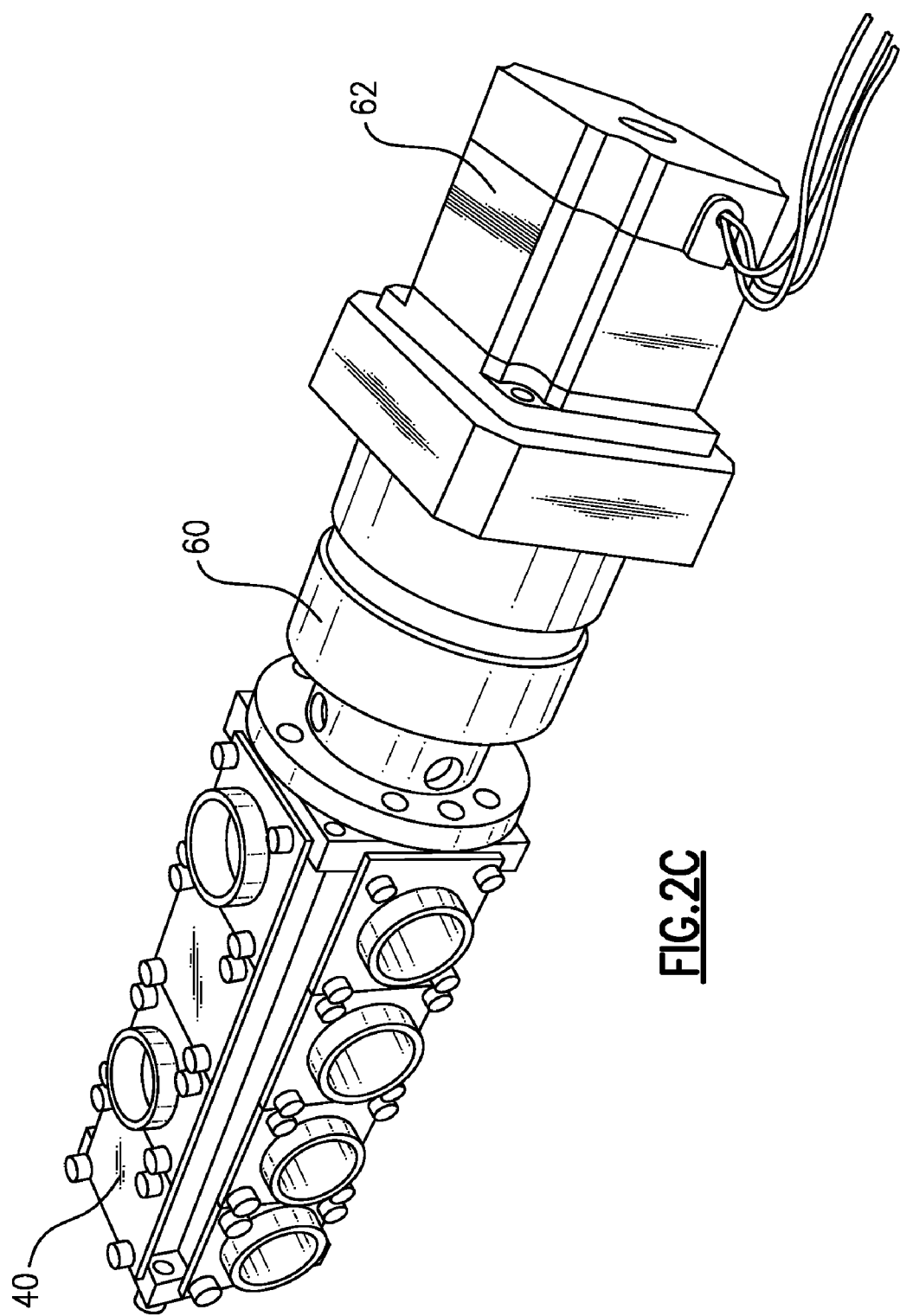
FIG. 2C shows a drive arrangement for the rotary valve.

FIG. 2C shows a gear box 60 connected to an actuator motor 62. Actuator motor 62 drives the driveshaft 58 (see FIG. 2A) through the gear box 60 to change the location of the several ball valves.

Figure 3:
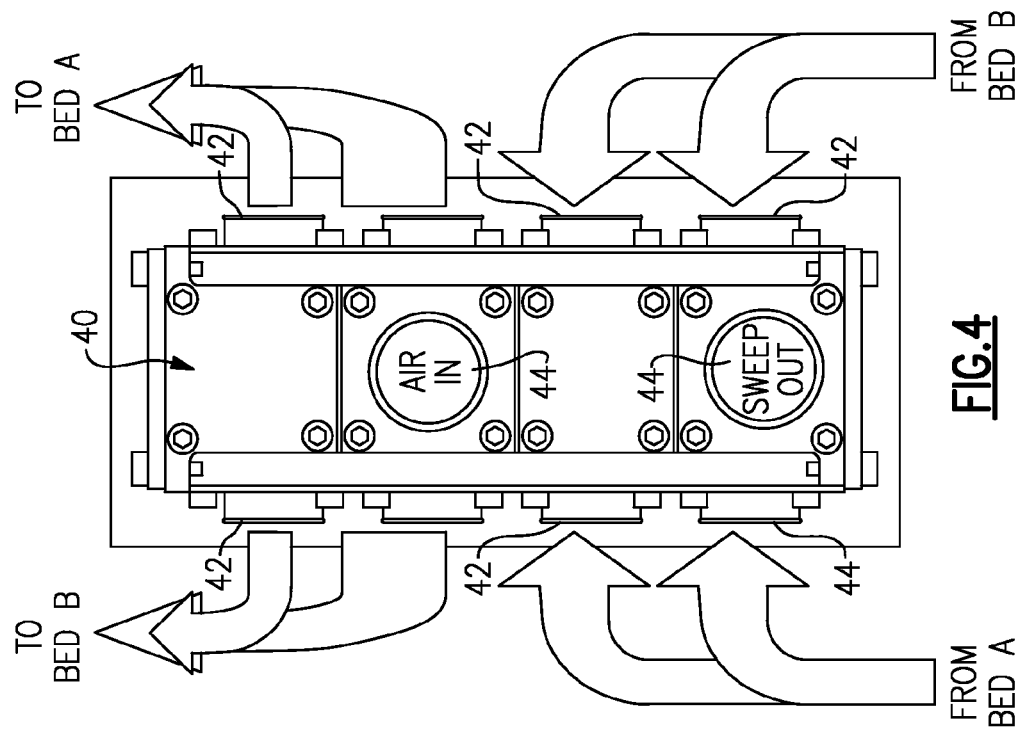
FIG. 3 shows a top view of a valve.
Figure 4:
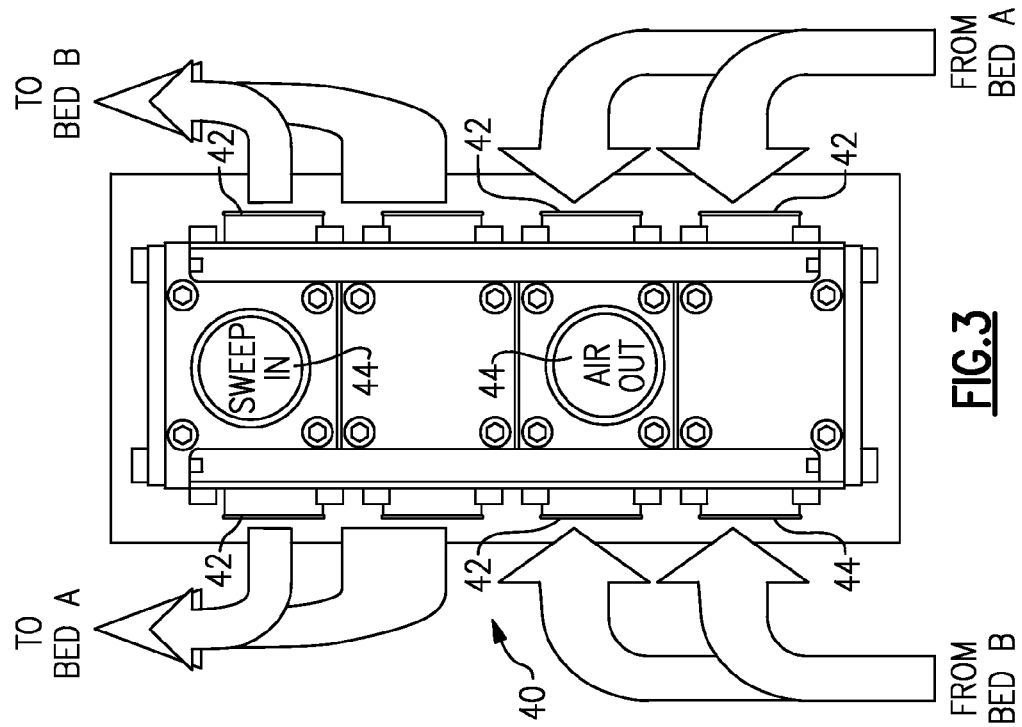
FIG. 4 shows a bottom view of the valve.

FIG. 3 shows that the ports 42 on the side include alternate connections to and from each of beds 34 and 124. One of the top ports 44 may be sweep air in, while the other may be clean air out. FIG. 4 shows the opposed view, and includes the air to be cleaned in passing in one port 44 while the sweep gas out connection is in another port 44.

Figure 5:
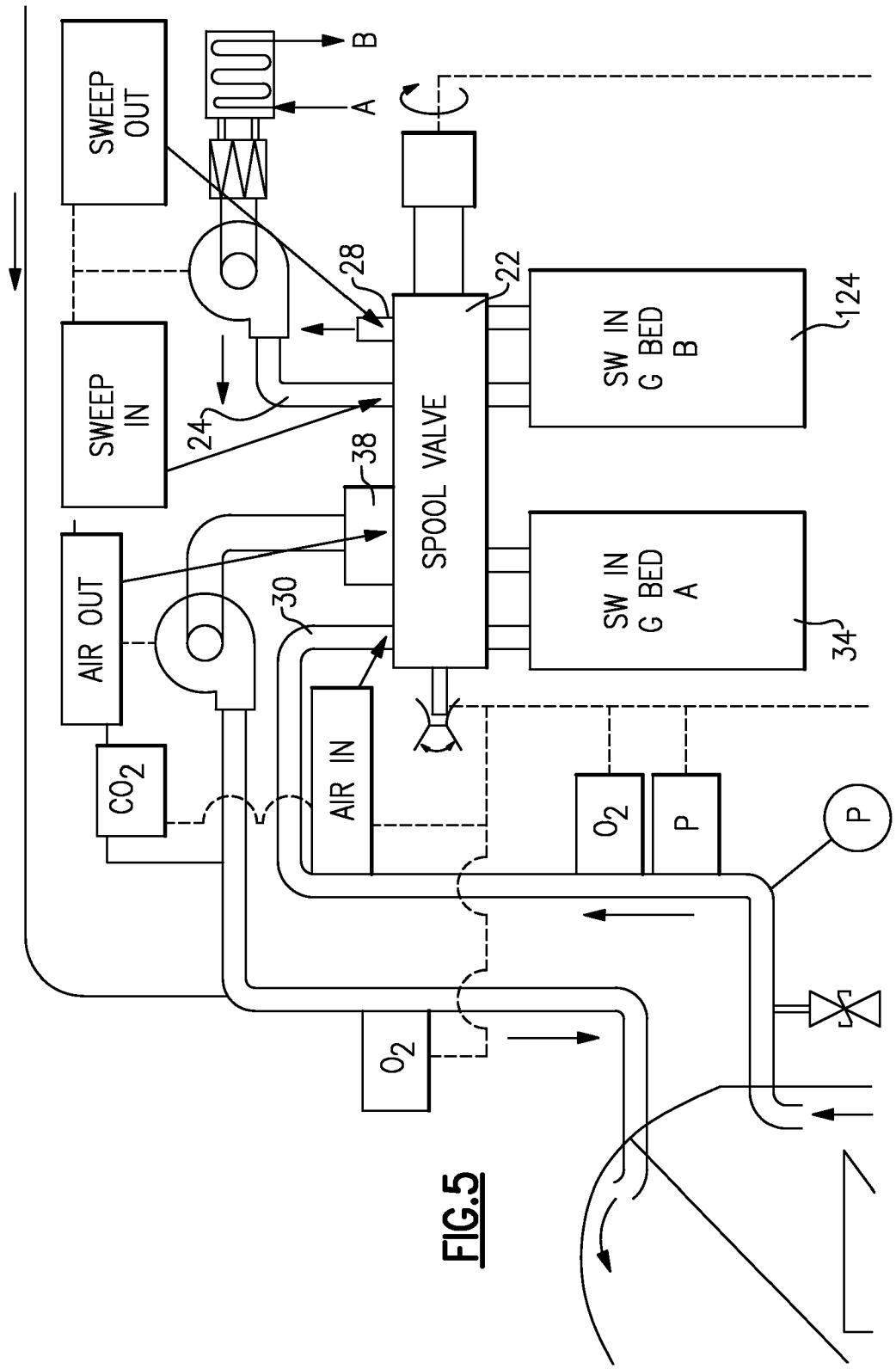
FIG. 5 shows the schematic of the valve in one application.

FIG. 5 is another schematic of the beds 34 and 124 connected to the process air to be cleaned connection 30, the "cleaned" process air to be utilized connection 38, the sweep (or cleaning) gas in connection 24, and the sweep gas out connection 28.

Figure 6:
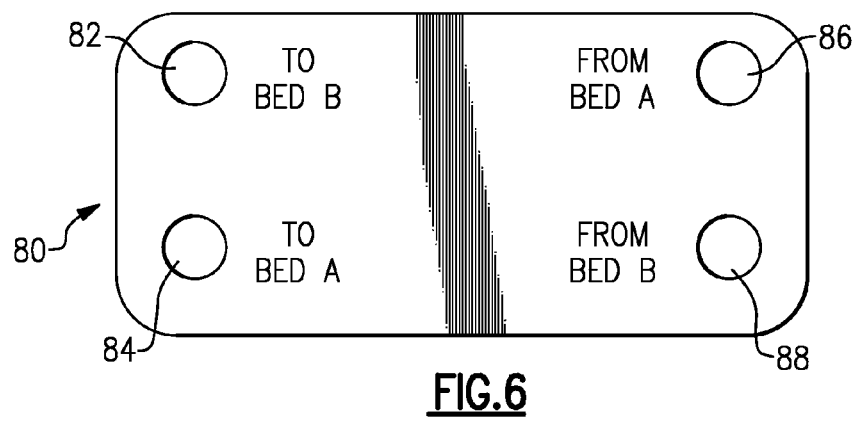
FIG. 6 shows connections to the valve.

As can be appreciated from FIG. 6, a plate 80 may include connection 82 to the bed B and a connection 88 from the bed B. Similar connections 84 and 86 to and from bed A are also included. It should be understood that the exact connection to the various ports or arrangement of the ports relative to each other can be done any number of ways, and that the illustrated embodiment is simply one way.

Figure 7A:
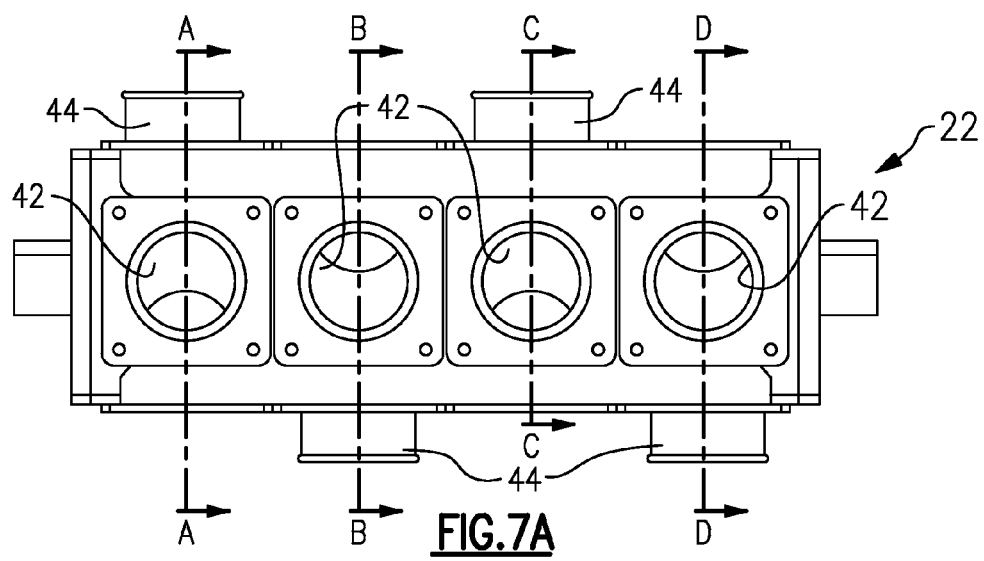
FIG. 7A shows the valve.

FIG. 7A shows the valve housing 40, ports 42, and the ports 44. FIG. 7B includes four cross-sections through the FIG. 7A view at the four locations of balls 52. In FIG. 7B, the valve elements 52 are positioned such that bed 34 is cleaning or adsorbing the impurities from the air while bed 124 is being cleaned, or is being desorbed. The vent out 32, or connection to the source of air to be cleaned passes to bed 34 through the first ball 52 at the section AA. At the same time, the ball 52 at the section BB connects the sweep gas in 25 to bed B. At section CC, the ball 52 is positioned from the bed 124 to pass to its downstream connection 28. Section DD shows that air passes through the fourth ball valve 52 from the bed 34 to the connection to the source of air to be utilized 38.

In one embodiment, the actuator motor 62 can rotate the valve element 50 through 270 degrees. While switching the two beds between the adsorb/desorb modes, there may be an intermediate bed equalization step which is shown in FIG. 7C. In FIG. 7C, the balls 52 are positioned to block the connections 32, 25, 28 and 38.

FIG. 7D shows further rotation, and in this embodiment 270 degrees of rotation counterclockwise from the zero, or FIG. 7B, position. The ball valve 52 at section AA communicates the source of air to be cleaned 32 to bed 124. The ball valve 52 at the section BB communicates the source of sweep air 25 to clean bed 34. The sweep air out connection 28 is connected by the ball 52 at section CC to receive the sweep air from bed 34. The ball at section DD receives clean air from bed 124 to the source 38 to be connected to a use of the clean air.

Again, the exact relative position of the four connections to the gas use, and gas source, and the connections to the beds may be done any number of ways. It is the use of a single rotary actuator to control all of the flow of the gas which is inventive here.

Although the preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A chemical treatment system comprising:
a pair of beds, with each of said beds having at least one connection to receive a source of gas, and an outlet for delivering gas downstream, and each of said beds including chemical treatment elements;
a first connection to a source of a gas to be treated, and a second connection for receiving treated gas to be delivered to a downstream use, a third connection to a source of a cleaning gas, and a fourth connection to deliver the cleaning gas downstream;
a single rotary valve for selectively connecting one of said source of gas to be cleaned to a first of said beds, and connecting said treated gas to said first bed, and at the same time connecting said source of cleaning gas to a second of said beds, and connecting said, connection for delivering the cleaning gas downstream from said second bed, while said first bed is in a cleaning mode and said second bed is in a being cleaned mode, and said single rotary valve including a rotary actuator for rotating said valve to selectively switch each of said first and second beds between said cleaning and being cleaned modes;
said single rotary valve includes at least four valve elements, with one of said valve elements being connected to each of said four connections; and
each of said valve elements are ball shaped.

2. The system as set forth in claim 1, wherein each of said valve elements have L-shaped passages within a valve body to selectively connect one of said connections to one of said beds.

3. The system as set forth in claim 1, wherein said rotary valve has at least three distinct positions, with a first position connecting said first bed to the cleaning mode and connecting said second bed to a being cleaned mode, a second position which does not connect any of said connections to either of said beds, and a third position that connects said first bed to the being cleaned mode, and connecting said second bed to the cleaning mode.

4. The system as set forth in claim 3, wherein the first position is spaced from the second position by 135 degrees, and said second position is spaced from said third position by an additional 135 degrees.

5. The system as set forth in claim 1, wherein said chemical treatment elements are sorbent beads which remove carbon dioxide from air to be treated.

6. The system as set forth in claim 1, wherein the downstream use is one of a spacesuit, a spaceship and a submarine.

7. The system as set forth in claim 1, wherein a downstream destination for said cleaning gas is a vent.

8. The system as set forth in claim 1, wherein a downstream destination for said cleaning gas is a vacuum.

9. A chemical treatment system comprising:
a pair of beds, with each of said beds having at least one connection to receive a source of gas, and an outlet for delivering gas downstream, and each of said beds including chemical treatment elements;
a first connection to a source of a gas to be treated, and a second connection for receiving treated gas to be delivered to a downstream use, a third connection to a source of a cleaning gas, and a fourth connection to deliver the cleaning gas downstream; and
a single rotary valve for selectively connecting one of said source of gas to be cleaned to a first of said beds, and connecting said treated gas to said first bed, and at the same time connecting said source of cleaning gas to a second of said beds, and connecting said connection for delivering the cleaning gas downstream from said second bed, while said first bed is in a cleaning mode and said second bed is in a being cleaned mode, and said single rotary valve including a rotary actuator for rotating said valve to selectively switch each of said first and second beds between said cleaning and being cleaned modes;
said single rotary valve includes at least four valve elements, with one of said valve elements being connected to each of said four connections;
wherein each of said valve elements have L-shaped passages within a valve body to selectively connect one of said connections to one of said beds; and
wherein spring elements hold a valve seat against ports at the end of said L-shaped passages to provide a fluid tight seal against each of said valve elements.

10. A chemical treatment system comprising:
a pair of beds, with each of said beds having at least one connection to receive a source of gas, and an outlet for delivering gas downstream, and each of said beds including chemical treatment elements;

a first connection to a source of a gas to be treated, and a second connection for receiving treated gas to be delivered to a downstream use, a third connection to a source of a cleaning gas, and a fourth connection to deliver the cleaning gas downstream;

a single rotary valve for selectively connecting one of said source of gas to be cleaned to a first of said beds, and connecting said treated gas to said first bed, and at the same time connecting said source of cleaning gas to a second of said beds, and connecting said connection for delivering the cleaning gas downstream from said second bed, while said first bed is in a cleaning mode and said second bed is in a being cleaned mode, and said single rotary valve including a rotary actuator for rotating said valve to selectively switch each of said first and second beds between said cleaning and being cleaned modes;

said single rotary valve includes at least four valve elements, with one of said valve elements being connected to each of said four connections, and said four valve elements each including an L-shaped passage, said four valve elements rotating together about a single axis, and said L-shaped passages connecting radially distinct positions on said four valve elements spaced about the single axis.

11. The system as set forth in claim 10, wherein each of said valve elements are ball shaped.

* * * * *